(12) United States Patent
 Kuwabara et al.

(10) Patent No.: US 9,421,955 B2
(45) Date of Patent: Aug. 23, 2016

(54) SUSPENSION STRUCTURE FOR IRREGULAR GROUND TRAVELING VEHICLE

(71) Applicant: HONDA MOTOR CO., LTD., Tokyo (JP)

(72) Inventors: Naoki Kuwabara, Wako (JP); Atsuko Yamaguchi, Wako (JP); Akio Handa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/607,357

(22) Filed: Jan. 28, 2015

(65) Prior Publication Data

US 2015/0210234 A1    Jul. 30, 2015

(30) Foreign Application Priority Data

Jan. 30, 2014   (JP) ................. 2014-016078

(51) Int. Cl.
 *B60T 11/10* (2006.01)
 *B60G 3/20* (2006.01)
 *B60T 17/04* (2006.01)
(52) U.S. Cl.
 CPC ............. *B60T 11/10* (2013.01); *B60G 3/20* (2013.01); *B60T 17/04* (2013.01); *B60G 2200/144* (2013.01); *B60G 2204/4308* (2013.01); *B60G 2300/07* (2013.01); *B60G 2300/124* (2013.01); *B60G 2300/13* (2013.01)
(58) Field of Classification Search
 CPC ....... B60T 11/10; B60T 17/04; B60K 17/22; B60G 3/20; B60G 2300/13; B60G 2200/144; B60G 2204/4308; B60G 2300/124; B60G 2300/07

See application file for complete search history.

(56) References Cited

U.S. PATENT DOCUMENTS

| 6,568,497 | B1 * | 5/2003 | Tezuka ..................... B62D 7/18 180/346 |
| 7,377,549 | B2 * | 5/2008 | Hasegawa ................ B60G 3/20 172/508 |
| 7,451,857 | B2 * | 11/2008 | Hasegawa ............. F16D 55/224 188/18 A |
| 7,744,104 | B2 * | 6/2010 | Kuwabara ................ B60G 3/20 280/124.134 |
| 7,934,735 | B2 * | 5/2011 | Kuwabara .............. B60G 7/001 280/124.1 |
| 2007/0074925 | A1 * | 4/2007 | Seki ........................ B60G 3/20 180/374 |
| 2011/0262211 | A1 * | 10/2011 | Garcia ................... B60G 7/005 403/11 |

FOREIGN PATENT DOCUMENTS

JP        2006-069436      3/2006

* cited by examiner

*Primary Examiner* — Darlene P Condra
(74) *Attorney, Agent, or Firm* — Rankin, Hill & Clark LLP (57) ABSTRACT

A suspension structure for an irregular ground traveling vehicle includes an upper arm and a lower arm, a drive shaft, a boot, and an outer guard. The upper and lower arms each have one end portion supported on a vehicle body frame. The drive shaft is disposed between the upper arm and the lower arm and transmits a drive force to a wheel. The boot covers an end portion of the drive shaft on a wheel side. The outer guard member covers a front side of the boot. A brake line, which extends from a caliper, is arranged within a width of the wheel and below the upper arm, and the outer guard member extends to an area in the vicinity of the upper arm.

8 Claims, 7 Drawing Sheets

SUSPENSION STRUCTURE FOR IRREGULAR GROUND TRAVELING VEHICLE

BACKGROUND OF THE INVENTION

1. Field of the Invention

The present invention relates to a suspension structure for an irregular ground traveling vehicle provided with a guard member, which protects a suspension and parts around the suspension.

2. Description of Related Art

Conventionally, there is known a structure where a guard member is disposed in front of a boot covering an equal velocity joint of a drive shaft, thus protecting the boot from scattered pebbles or the like (see Patent JP-A-2006-69436, for example).

On the other hand, when a brake pipe or line, which is disposed along an upper arm that constitutes a suspension, extends toward an upper side of the upper arm within a wheel, although the effect of scattered pebbles or the like on the brake line or the like can be decreased, there has been a tendency to make a diameter of the wheel large-sized to ensure a clearance between a wheel rim and the brake line.

SUMMARY OF THE INVENTION

The invention has been made in view of the above-mentioned circumstances, and it is an object of the invention to provide a suspension structure for an irregular ground traveling vehicle that facilitates the acquisition of a clearance between a suspension member or a member disposed on a suspension member side and a wheel rim, thus increasing the degree of freedom of a wheel to be mounted while reducing an effect of scattered pebbles or the like exerted on a brake line.

To overcome the drawbacks known in the art, the present invention provides the suspension structure for an irregular ground traveling vehicle that includes: an upper arm and a lower arm each having one end portion thereof respectively supported on a vehicle body frame; a wheel supported on the other end portions of the upper arm and the lower arm via a knuckle member; a brake disc that is disposed inside the wheel in the radial direction and within a lateral width of the wheel; a caliper that sandwiches the brake disc; a drive shaft that is disposed between the upper arm and the lower arm and transmits a drive force to the wheel; and a boot that covers an end portion of the drive shaft on a wheel side. The suspension structure includes a guard member that covers a front side of the boot, a brake line, which extends from the caliper, is arranged within a width of the wheel and below the upper arm, and the guard member extends to an area in a vicinity of the upper arm.

In the above-mentioned construction, a height of an upper end of the guard member may be approximately equal to a height of an upper end of the brake line disposed below the upper arm.

Further, a portion of the guard member may be disposed within a width of the wheel, and a connecting portion between the caliper and the brake line may be covered by the guard member as viewed in a front view.

Also, a bracket that supports a lower end of a front cushion unit may be mounted on an upper surface of the upper arm, and the brake line may extend to an upper surface of the upper arm through a rear side of the bracket.

Furthermore, the guard member may be formed into an approximately arcuate cross section such that a front surface of the guard member projects frontwardly, and a tangent line extending from an upper end of the front surface of the guard member may be directed to the upper arm.

In accordance with the present invention, the suspension structure includes the guard member that covers the front side of the boot, the brake line that extends from the caliper is arranged within the width of the wheel and below the upper arm, and the guard member extends to the area in the vicinity of the upper arm. Accordingly, the brake line does not project toward a wheel rim side from the upper arm and hence, a clearance between the wheel rim and the brake line and a clearance between the wheel rim and the upper arm can be respectively ensured. Accordingly, the degree of freedom of the wheel to be mounted can be increased. Further, the guard member extends to the area in the vicinity of the upper arm from the front side of the boot and hence, the effect of scattered pebbles exerted on the brake line can be decreased.

The height of the upper end of the guard member is approximately equal to the height of the upper end of the brake line disposed below the upper arm and hence, the brake line can be protected by the guard member.

A portion of the guard member is disposed within the width of the wheel, and the connecting portion between the caliper and the brake line is covered by the guard member as viewed in a front view and hence, by arranging the guard member within the width of the wheel, there is no gap between the wheel and the guard member as viewed in a front view whereby the respective parts behind the guard member can be surely protected. Further, the connecting portion between the caliper and the brake line is covered by the guard member and hence, the connecting portion between the caliper and the brake line can be protected by the guard member.

The bracket that supports the lower end of the front cushion unit is mounted on the upper surface of the upper arm, and the brake line extends to the upper surface of the upper arm through the rear side of the bracket and hence, the brake line can be protected by the upper arm and the bracket.

The guard member is formed into an approximately arcuate cross section such that the front surface of the guard member projects frontwardly, and the tangent line that extends from the upper end of the front surface of the guard member is directed to the upper arm. Accordingly, it is possible to suppress pebbles or the like, which hit the front surface of the guard member from a front side of the vehicle body, from being scattered between the guard member and the upper arm and hence, a protective effect acquired by the guard member can be enhanced.

BRIEF DESCRIPTION OF THE DRAWINGS

These and further features of the invention will be apparent with reference to the following description and drawings, wherein:

FIG. 6A and FIG. 6B are explanatory views showing an outer guard member, wherein

DETAILED DESCRIPTION OF THE INVENTION

Hereinafter, one embodiment of the invention is explained by reference to drawings. In the explanation, the description of the directions of frontwardly and rearwardly, leftward and rightward, and upwardly and downwardly are equal to the directions of a vehicle body unless otherwise specified. Further, in the respective drawings, symbol FR indicates a front side of the vehicle body, symbol UP indicates an upper side of the vehicle body, and symbol LE indicates a left side of the vehicle body.

Figure 1:
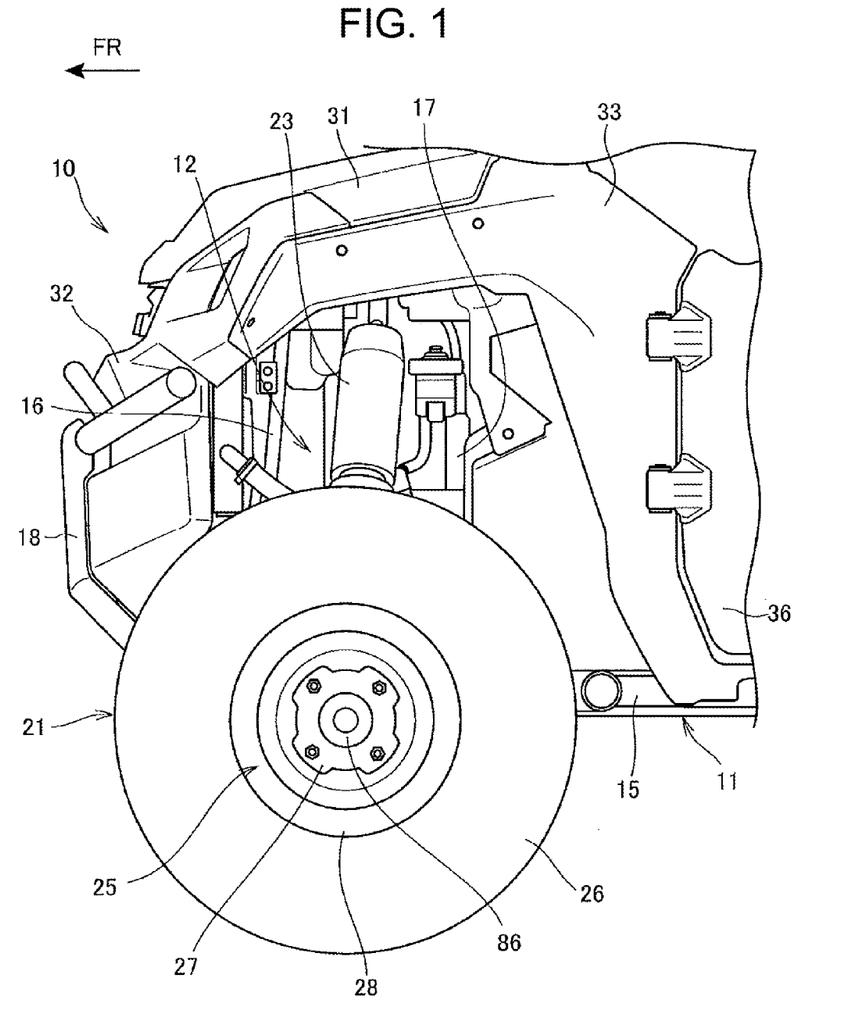
FIG. 1 is a left side view showing an essential part of an irregular ground traveling vehicle provided with the suspension structure according to one embodiment of the invention.

FIG. 1 is a left side view showing an essential part of an irregular ground traveling vehicle 10 provided with the suspension structure according to one embodiment of the invention.

In the irregular ground traveling vehicle 10, a front suspension 12 is mounted on a front portion of a vehicle body frame 11.

The vehicle body frame 11 includes: left and right front lower frames 15, 15 (only the front lower frame 15 on a viewer's side shown in the drawing) that extend in the longitudinal direction; and a first raised frame 16 and a second raised frame 17 that are raised from the respective front lower frames 15 while being spaced apart from each other in the longitudinal direction. Symbol 18 indicates a front guard frame, which is connected to front end portions of the front lower frames 15.

The front suspension 12 is a device that suspends left and right front wheels 21, 21 (only the front wheel 21 on a viewer's side shown in the drawing), and has a function of supporting and positioning the front wheels 21, 21, and a function of absorbing an impact that is transmitted to the vehicle body frame 11 from the front wheels 21, 21. Symbol 23 indicates a front cushion unit provided as a buffer and constituting a portion of the front suspension 12.

The front wheel 21 includes a wheel 25 and a tire 26, which is mounted on the wheel 25.

The wheel 25 includes a disc portion 27, which is mounted on a hub 86 (see FIG. 3) described later; and a cylindrical rim portion 28, which is mounted on an outer peripheral portion of the disc portion 27 and on which the tire 26 is mounted.

Here, symbol 31 indicates a front cover, which covers a steering mechanism of the front wheel 21, a front-wheel-use final reduction gear and the like from above together with a hood, which is mounted on a front portion of the vehicle body in an openable and closeable manner, symbol 32 indicates a radiator grill, which covers a radiator 33 and the like from a front side, symbol 34 indicates a front fender, which covers the front wheel 21 from above and behind, and symbol 36 indicates a front door of a cabin.

Figure 2:
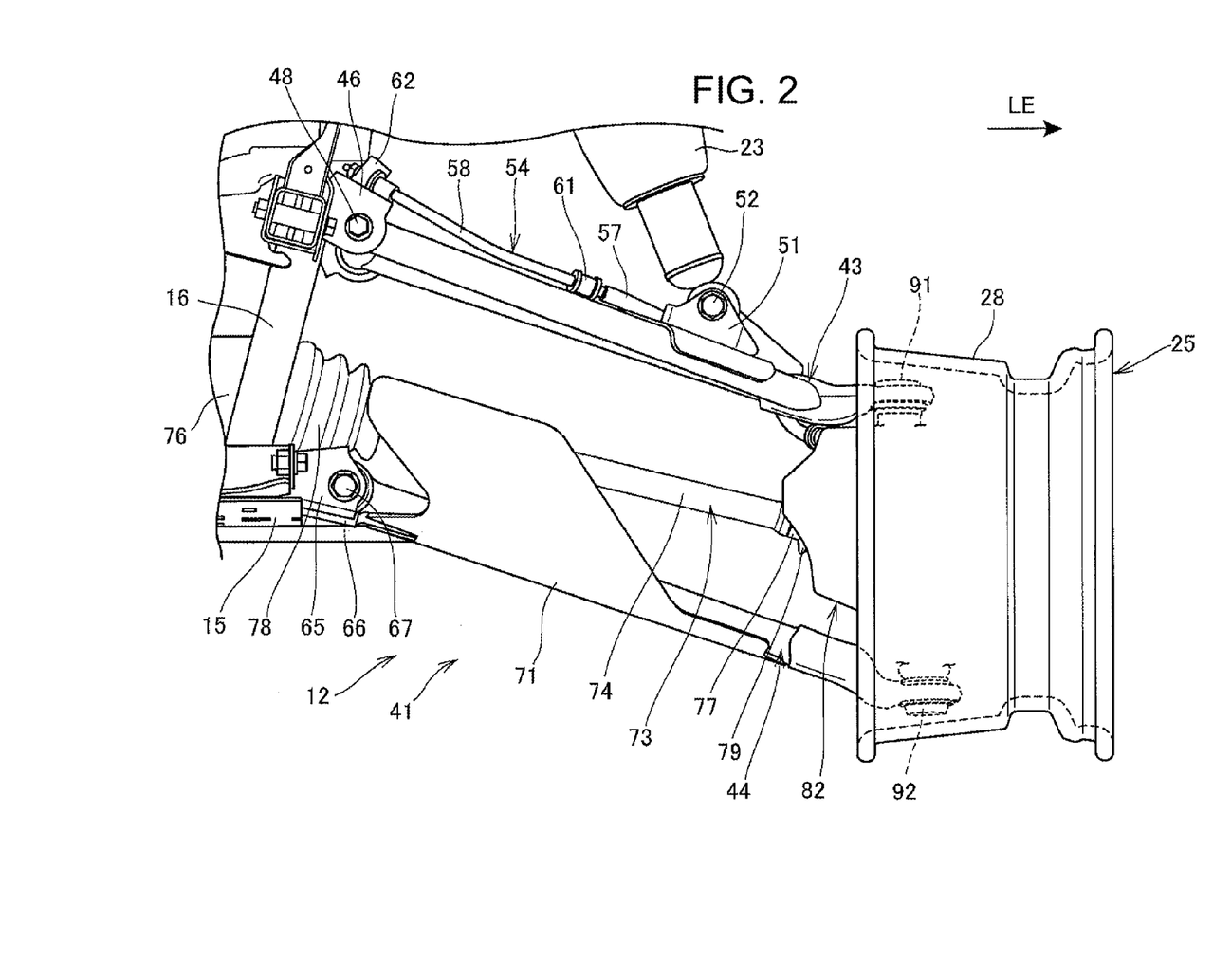
FIG. 2 is a front view of an essential part showing a left suspension portion of a front suspension.

FIG. 2 is a front view of an essential part showing a left suspension portion 41 of the front suspension 12.

The left suspension portion 41, which constitutes a left side of the front suspension 12, includes: an upper arm 43, which is disposed between the first raised frame 16 and the second raised frame 17 (see FIG. 1) and the front wheel (see FIG. 1); and a lower arm 44, which is disposed between the front lower frame 15 and the front wheel 21.

One end portion of the upper arm 43 is vertically swingably supported on an upper bracket 46, which is mounted on the first raised frame 16 and the second raised frame 17 in a longitudinally extending manner via a bolt 48.

A cushion lower bracket 51 is mounted on an upper portion of the upper arm 43 at a position closer to the front wheel 21, and a lower end portion of the front cushion unit 23 is connected to the cushion lower bracket 51 in a swingable manner via a bolt 52.

A brake line 54 extends toward a vehicle body side from a front disc brake (not shown in the drawing), which is disposed inside the front wheel 21 along the upper arm 43. The brake line 54 includes a rubber-made brake hose 57 and a metal-made brake tube 58, and a connecting portion between the brake hose 57 and the brake tube 58 is fixed by a pipe fixing portion 61, which is mounted on the upper arm 43. Symbol 62 indicates a bracket-side pipe fixing portion, which is mounted on an upper portion of the upper bracket 46 for fixing an end portion of the brake tube 58.

One end portion of the lower arm 44 is supported on a front lower bracket 65 and a rear lower bracket 66, which are mounted on a side portion of the front lower frame 15 via bolts 67, 67 (only the bolt 67 on a viewer's side shown in the drawing), respectively, in a vertically swingable manner. An inner guard member 71, which is formed by bending a plate, is mounted on a lower portion of the lower arm 44.

A drive shaft 73 that transmits a drive force from the front-wheel-use final reduction gear (not shown in the drawing), which is arranged inside in the vehicle width direction to the front wheel 21, is arranged between the upper arm 43 and the lower arm 44. The front-wheel-use final reduction gear is connected to a power unit (not shown in the drawing) via a drive shaft (not shown in the drawing).

The drive shaft 73 includes: a shaft body 74; constant velocity joints 76, 77 that are mounted on both ends of the shaft body 74, respectively; and rubber-made boots 78, 79 that cover the constant velocity joints 76, 77, respectively. The shaft body 74 and a portion of the boot 78 inside in the vehicle width direction are covered with and protected by the inner guard member 71 from a front side together with the lower arm 44. The boot 79 outside in the vehicle width direction is covered with and protected by an outer guard member 82, which is mounted on a knuckle (not shown in the drawing) in the inside of the wheel 25 from a front side.

Figure 3:
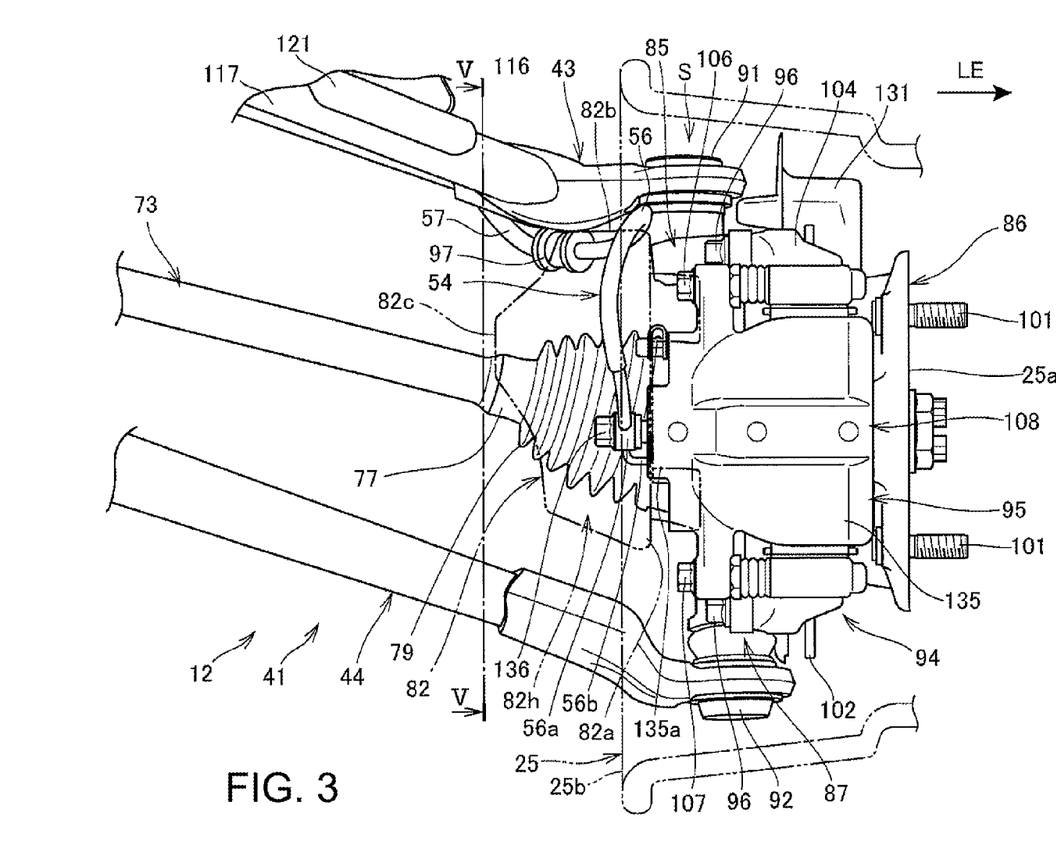
FIG. 3 is a front view showing the left suspension portion of the front suspension.

FIG. 3 is a front view showing the left suspension portion 41 of the front suspension 12.

The left suspension portion 41 includes: the upper arm 43; the lower arm 44; a knuckle 85 that is connected to the other ends of the upper arm 43 and the lower arm 44, respectively; and the hub 86 that is rotatably supported on the knuckle 85. The knuckle 85 and the hub 86 constitute a knuckle member 87, and a main part of the knuckle member 87 is arranged in the inside of the wheel 25.

The knuckle 85 is rotatably connected to the upper arm 43 and the lower arm 44 via ball joints 91, 92, respectively. A caliper 95, which constitutes a front disc brake 94, is mounted on a front portion of the knuckle 85 using a plurality of bolts 96, and the outer guard member (guard member) 82 is mounted on an inner portion of the knuckle 85.

The ball joints 91, 92, which are mounted on distal end portions of the upper arm 43 and the lower arm 44, respectively, are arranged within a width of the wheel 25 as shown in FIG. 2, and a predetermined clearance is ensured between the upper and lower arms 43, 44 and the rim portion 28. In FIG. 2 and FIG. 3, a space of a gap formed between the wheel 25 and the upper arm 43 is defined as S. In this embodiment, there is no brake pipe or line 54 in the space S and hence, the space S can be made small.

Returning to FIG. 3, the brake pipe or line 54 includes a metal-made brake tube 56 which extends from the caliper 95 and is connected to the brake hose 57. The brake tube 56 extends upwardly from a connecting portion with the caliper 95 as viewed in a front view, and is fixed at a pipe fixing portion 97 which is mounted on the knuckle 85 and is positioned below the upper arm 43. The brake hose 57 passes through an area behind the upper arm 43 and extends to an area above the upper arm 43 from the pipe fixing portion 97.

The outer guard member 82 covers a connecting portion of the brake tube 56 of the brake line 54 connected to the caliper 95, the approximately whole portion of the brake tube 56 except for an upper end side of the brake tube 56, and a portion of the pipe fixing portion 97 from a front side in the longitudinal direction of the vehicle body.

The hub 86 is spline-connected to one constant velocity joint 77 of the drive shaft 73, and includes a mounting surface 25a on which the wheel 25 of the front wheel 21 (see FIG. 2) is mounted, and a plurality of stud bolts 101 that project from the mounting surface 25a. A brake disc 102 to which braking is applied when the brake disc 102 is sandwiched by the caliper 95 is mounted on the hub 86. The above-mentioned caliper 95 and the brake disc 102 constitute the front disc brake 94, and are arranged within the width of the wheel 25.

The caliper 95 is constituted of a caliper bracket 104, which is fixed to the knuckle 85 by a plurality of bolts 96, and a caliper assembly 108, which is supported on the caliper bracket 104 via a pair of bolts 106, 107. An end portion of a shaft portion of each bolt 106, 107 is formed into a pin shape, and the caliper assembly 108 is slidably connected to the pin portions of the bolts 106, 107.

The caliper assembly 108 is constituted of: a caliper body 135, which is connected to the caliper bracket 104; a pair of pads, which is arranged inside the caliper body 135 and sandwiches the brake disc 102 therebetween; and a piston, which is mounted on the caliper body 135 for pressing the pads to the brake disc 102 and the like.

In the drawing, symbol 25b indicates an inner end surface of the wheel 25.

An outer portion 82a of the outer guard member 82 on an outer side in the vehicle width direction (the outer portion 82a of a front wall 82h described later) is arranged inside the wheel 25. A gap is formed vertically between an upper edge portion 82b of the outer guard member 82 and a lower portion of the upper arm 43 so as to prevent the outer guard member 82 from interfering with the upper arm 43 when the front wheel 21 is steered and when the front wheel 21 strokes in the vertical direction with respect to the vehicle body.

An upper portion of the brake tube 56 of the brake line 54 projects upwardly from the outer guard member 82. However, the projecting portion of the brake tube 56 is arranged inside the wheel 25 and hence, the projecting portion can be protected from scattered pebbles or the like. As viewed from a front side, a portion of the brake hose 57 of the brake line 54 extending rearwardly from an area below the upper arm 43 is not covered with the inner guard member 71 from a front side. However, the brake hose 57 is arranged at a deep position in the vicinity of a rear portion of the upper arm 43. An inner portion 82c of the outer guard member 82, which extends to an innermost side in the vehicle width direction, is arranged at the approximately same position as the brake hose 57 in the vehicle width direction. Due to this structure, it is possible to enhance an effect of protecting the brake hose 57.

Figure 4:
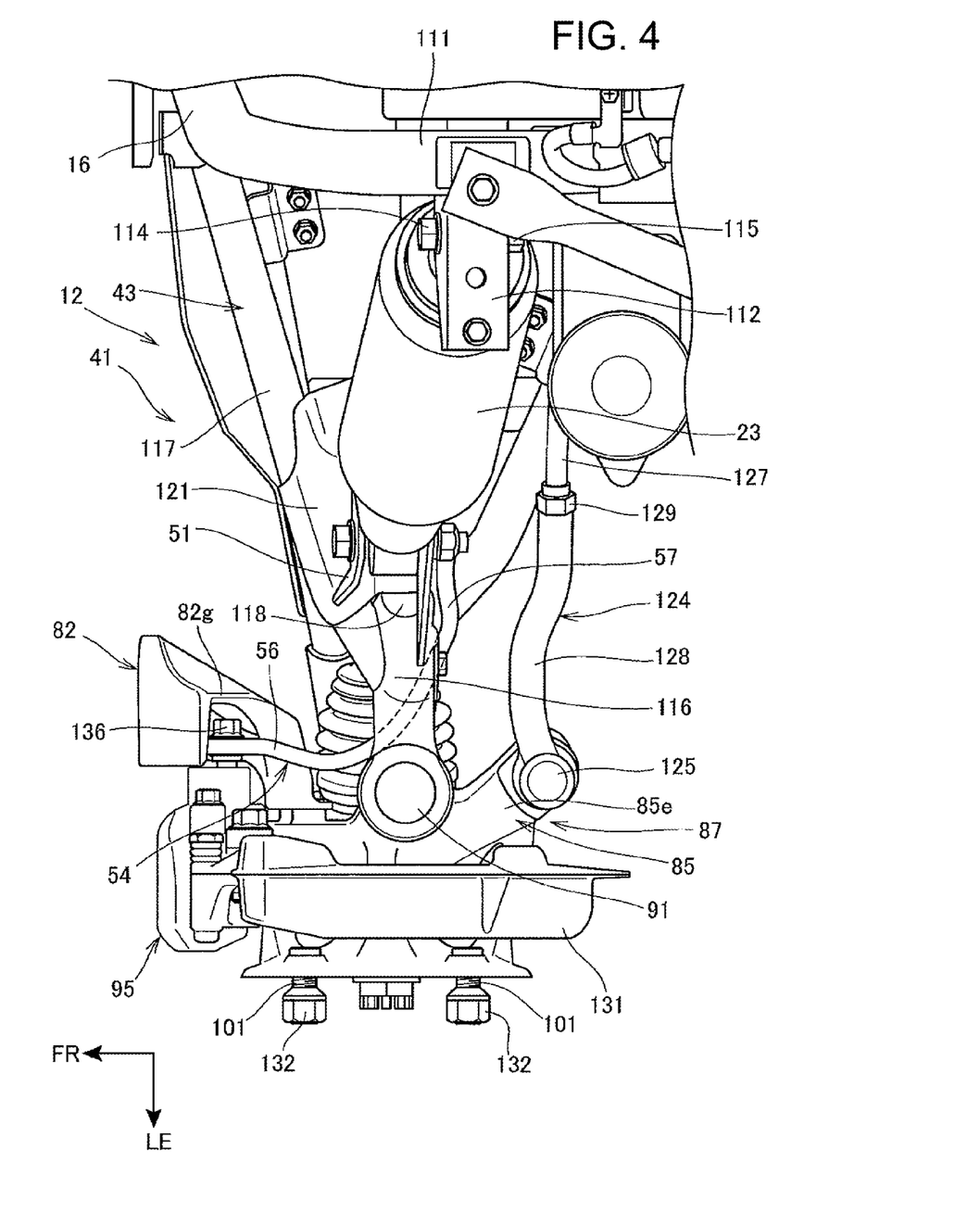
FIG. 4 is a plan view of the essential part showing the left suspension portion of the front suspension.

FIG. 4 is a plan view of an essential part showing the left suspension portion 41 of the front suspension 12.

A longitudinally-extending frame 111, which extends in the longitudinal direction, is integrally formed with upper end portions of the first raised frame 16 and the second raised frame 17 (see FIG. 1), which constitute the vehicle body frame 11, respectively.

A cushion upper bracket 112, which extends in the vehicle width direction, is mounted on the longitudinally-extending frame 111, and an upper end portion of the front cushion unit 23 is mounted on the cushion upper bracket 112 in a swingable manner using a bolt 114 and a nut 115.

The upper arm 43 includes a connecting member 116, a front arm 117, a rear arm 118, and a reinforcing plate 121. The connecting member 116 is a portion that is connected to the knuckle 85 via the ball joint 91. The front arm 117 extends inwardly in the vehicle width direction and obliquely frontwardly from a front surface of the connecting member 116. The rear arm 118 extends inwardly in the vehicle width direction from an inner end portion of the connecting member 116. The reinforcing plate 121 is mounted on upper surfaces of the front arm 117 and rear arm 118 in the vicinity of the base portions of the front and rear arms 117, 118, and the cushion lower bracket 51 is mounted on an upper surface of the reinforcing plate 121.

A rear arm portion 85e, which extends inwardly in the vehicle width direction and obliquely rearwardly, is formed as an integral part of the knuckle 85. A tie rod 124, which constitutes a portion of the steering mechanism for steering the front wheel 21 (see FIG. 1), is connected to a distal end portion of the rear arm portion 85e by way of a ball joint 125. The tie rod 124 includes: a rod-shaped tie rod body 127; a tie rod end 128, which is threadedly joined to an end portion of the tie rod body 127; and a lock nut 129, which locks a threaded connection of the tie rod end 128 to the tie rod body 127.

One end portion of the tie rod body 127 is connected to a steering shaft (not shown in the drawing) side. When a steering wheel is operated, along with the rotation of the steering shaft that is mounted on the steering wheel, the tie rod 124 is moved in the vehicle width direction, and the knuckle 85 is rotated about a king pin axis passing through the center of the respective upper and lower ball joints 91, (the ball joint 92 shown in FIG. 3) so that the front wheel 21 (see FIG. 1) is steered.

The brake line 54 is arranged behind the outer guard member 82. As viewed in a plan view, the brake tube 56 extends rearwardly from a connecting portion thereof, which is connected with the caliper 95 and is bent inwardly in the vehicle width direction at a position in the vicinity of a front side of the connecting member 116 of the upper arm 43. Then, the brake tube 56 extends below the connecting member 116 while obliquely intersecting the connecting member 116. Below the connecting member 116, the brake hose 57 is connected to the brake tube 56. The brake hose 57 is routed around toward a rear side from an area below the connecting member 116, extends upwardly, passes an area behind the cushion lower bracket 51, and extends inwardly in the vehicle width direction approximately above the rear arm 118. Symbol 131 indicates a panel mounted on an outer surface of the knuckle 85, and symbol 132 indicates a wheel nut that is threadedly joined to the stud bolt 101 for mounting the front wheel 21 on the hub 86.

Figure 5:
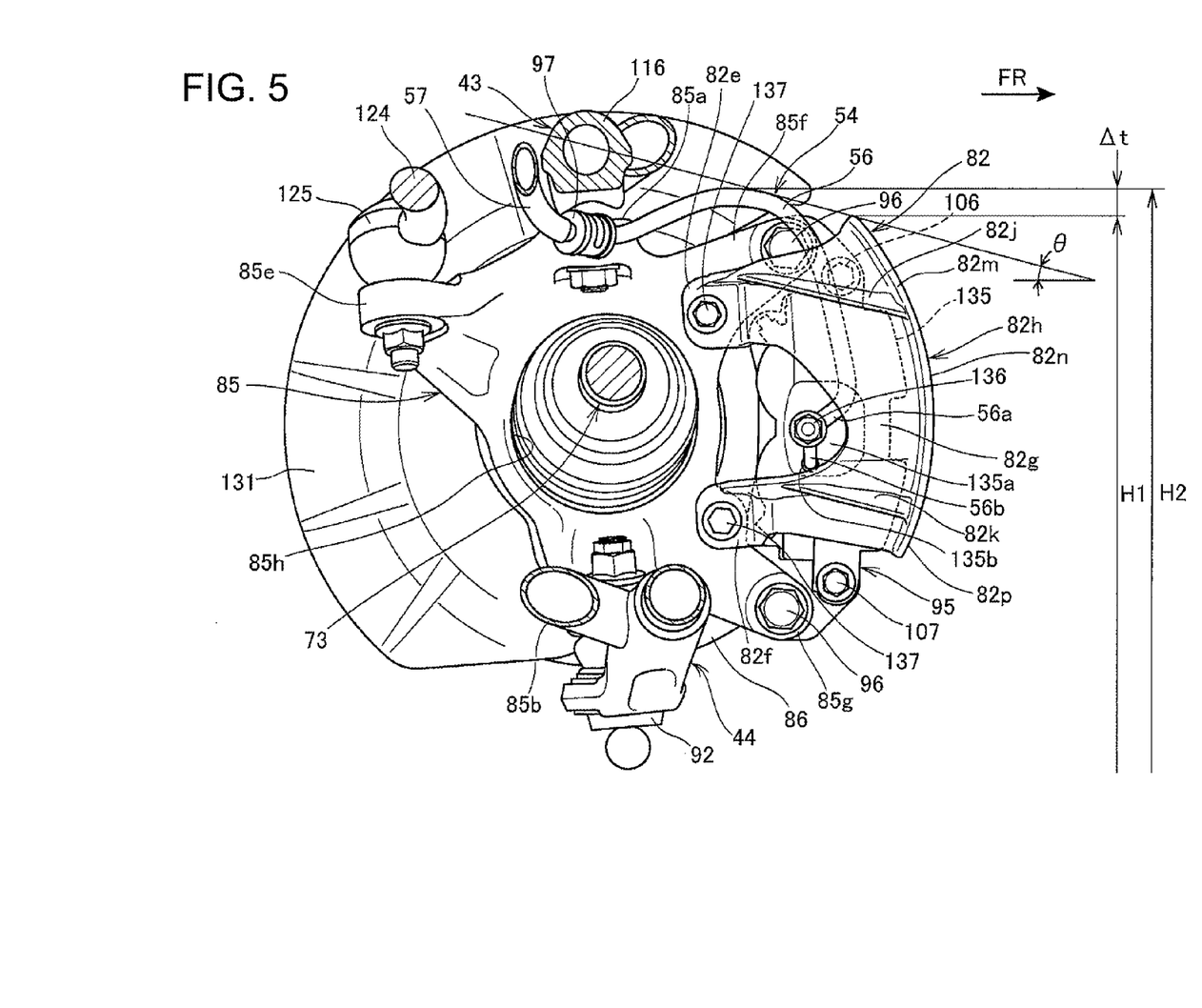
FIG. 5 is a cross-sectional view taken along a line V-V in FIG. 3.

FIG. 5 is a cross-sectional view taken along a line V-V in FIG. 3.

The knuckle 85 is an integral body formed of: upper and lower arm connecting portions 85a, 85b that are connected to the upper arm 43 and the lower arm 44, respectively; the rear arm portion 85e to which the tie rod 124 is connected by way of the ball joint 125; and caliper mounting arm portions 85f, 85g on which the caliper 95 is mounted. A center hole 85h into which the drive shaft 73 connected to the hub 86 is inserted is formed in a center portion of the knuckle 85.

The brake line 54 is connected to the caliper 95 in a state where a connecting end portion 56a, which is formed on one end portion of the brake tube 56, is mounted on and connected to a pipe connecting portion 135a, which is formed on an inner surface of the caliper body 135, which constitutes the caliper 95, using a banjo bolt 136. Symbol 56b indicates a rotation stopper portion formed on the connecting end portion 56a. A distal end of the rotation stopper portion 56b is inserted into a rotation stopping hole portion 135b formed in the vicinity of the pipe connecting portion 135a.

The brake tube 56 temporarily extends obliquely frontwardly and upwardly from the connecting end portion 56a and, next, the brake tube 56 is bent upwardly and extends obliquely upwardly and rearwardly. Then, the brake tube 56 is largely bent obliquely rearwardly and downwardly, and the brake tube 56 is supported on the pipe fixing portion 97 below the upper arm 43. Then, the brake hose 57 extending from the pipe fixing portion 97 is routed around to an area behind the connecting member 116 along an outer peripheral portion of the connecting member 116.

The outer guard member 82 is an integral body formed of: an upper leg portion 82e; a lower leg portion 82f; an intermediate connecting wall 82g; a front wall 82h; an upper reinforcing rib 82j; and a lower reinforcing rib 82k.

The upper leg portion 82e and the lower leg portion 82f are portions that are threadedly joined to base portions of the caliper mounting portions 85f, 85g of the knuckle 85 using bolts 137, 137 respectively. The intermediate connecting wall 82g is connected to the upper leg portion 82e and the lower leg portion 82f. The front wall 82h is formed on a front edge of the intermediate connecting wall 82g so as to approximately orthogonally intersect the intermediate connecting wall 82g. A front surface 82q of the front wall 82h is formed into a curved surface having an approximately arcuate cross section, which projects toward a front side of the vehicle body approximately along an inner peripheral surface of the rim portion 28 (see FIG. 1) of the wheel 25 (see FIG. 1) as viewed in a side view. The upper reinforcing rib 82j is formed over the upper leg portion 82e, the intermediate connecting wall 82g, and the front wall 82h. The lower reinforcing rib 82k is formed over the lower leg portion 82f, the intermediate connecting wall 82g and the front wall 82h. The rigidity of the outer guard member 82 can be enhanced with the use of the upper reinforcing rib 82j and the lower reinforcing rib 82k.

The front wall 82h is constituted of: an upper projecting wall 82m disposed above the upper reinforcing rib 82j; an intermediate front wall 82n disposed below the upper reinforcing rib 71j and above the lower reinforcing rib 71k; and a lower projecting wall 82p disposed below the lower reinforcing rib 82k.

The connecting end portion 56a of the brake tube 56 is exposed to the inside in the vehicle width direction together with a banjo bolt 136 through between the upper leg portion 82e and the lower leg portion 82f of the outer guard member 82. Further, portions of the brake tube 56 are covered with the upper leg portion 82e and the intermediate connecting wall 82g from the inside in the vehicle width direction.

The panel 131 forms an approximately disc-shaped wall together with the outer guard member 82, the knuckle 85 and the caliper 95. As a result, the panel 131 covers and protects the disc brake 102 (see FIG. 3) from the inside in the vehicle width direction.

Assume a height of an upper end of the front wall 82h of the outer guard member 82 as H1, and a height of an upper end of the brake tube 56 as H2. Further, assume an angle of a straight line that passes the upper end of the front wall 82h and is in contact with the upper side of the brake tube 56 with respect to the horizontal direction as θ. For example, provided that the angle θ satisfies the relationship of 0≤θ≤25°, even when the difference between the height H1 and the height H is Δt, it is safe to say that the height H1 and the height H2 are approximately equal. Here, both the heights H1, H2 are heights measured from a predetermined position.

Figure 6A:
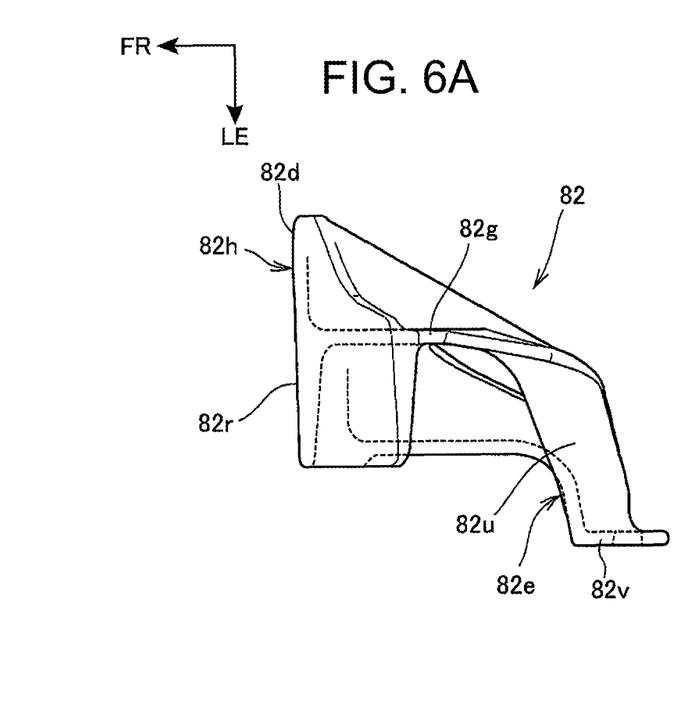
FIG. 6A is a plan view.
Figure 6B:
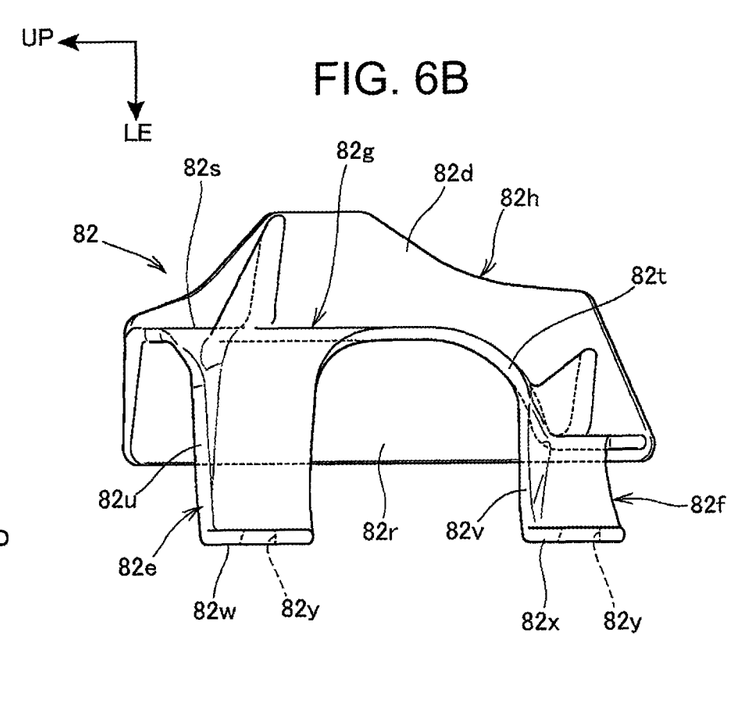
FIG. 6B is a back view.

FIG. 6A and FIG. 6B are explanatory views showing the outer guard member 82, wherein FIG. 6A is a plan view and FIG. 6B) is a back view.

As shown in FIG. 6A, the front wall 82h of the outer guard member 82 is constituted of: an inner wall portion 82d disposed on an inner side in the vehicle width direction with respect to the intermediate connecting wall 82g, which constitutes a boundary; and an outer wall portion 82r on an outer side in the vehicle width direction with respect to the intermediate connecting wall 82g. In this manner, due to the provision of the intermediate connecting wall 82g, as shown in FIG. 4, the brake line 54 can be arranged outside the intermediate connecting wall 82g in the vehicle width direction and hence, it is possible to guard the brake line 54 from objects scattered from the inside in the vehicle width direction by the intermediate connecting wall 82g whereby an effect of protecting the brake line 54 can be enhanced.

As shown in FIG. 6B, a flat portion 82s is formed on an upper portion of the intermediate connecting wall 82g, and a bent portion 82t, which is bent outwardly in the vehicle width direction, is formed on a lower portion of the intermediate connecting wall 82g. Accordingly, the brake line 54 can be covered with the bent portion 82t also from below thus enhancing an effect of protecting the brake line 54 from the scattered pebbles or the like. Further, by forming the bent portion 82t, the lower leg portion 82f can be shortened compared to the upper leg portion 82e, thus enhancing the rigidity of the outer guard member 82l. The upper leg portion 82e and the lower leg portion 82f include upper wall portions 82u, 82v, which are integrally formed on upper edges of the upper and lower leg portions 82e, 82f, respectively, and mounting portions 82w, 82x for mounting the upper and lower leg portions 82e, 82f on the knuckle 85. Bolt insertion holes 82y, 82y, which allow bolts to pass therethrough, are formed in the mounting portions 82w, 82x, respectively.

By forming the upper wall portions 82u, 82v as described above, the rigidity of the upper leg portion 82e and the lower leg portion 82f can be enhanced. Further, rain water, mud and the like is minimally splashed onto the bolts 137, 137 due to the provision of the upper wall portions 82u, 82v (see FIG. 5). Accordingly, the loosening and the fastening of the bolt 137 can be smoothly performed so that the mounting and the removal of the outer guard member 82 can be easily performed and hence, the maintenance property of the suspension can be enhanced over a long period.

Figure 7:
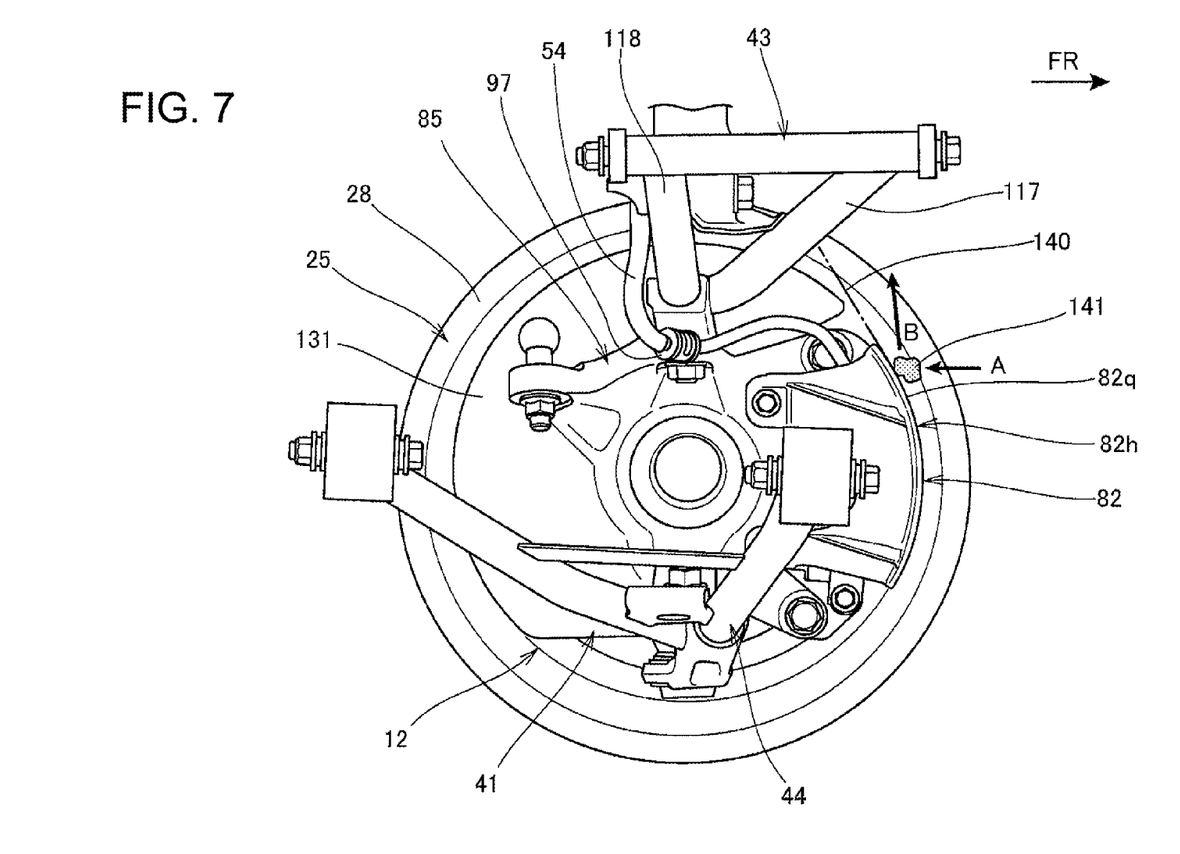
FIG. 7 is an operational view showing the manner of operation of the outer guard member.

FIG. 7 is an operational view showing the manner of operation of the outer guard member 82.

When the outer guard member 82 is viewed in the vehicle width direction, a tangent line 140 that is in contact with an upper edge of the front surface 82q of the front wall 82h of the outer guard member 82 extends toward the front arm 117 of the upper arm 43 or a side in front of the front arm 117.

For example, as indicated by an arrow A, when a pebble 141 (or mud and the like) hits the front wall 82h from a front side of the vehicle body, as indicated by an arrow B, the pebble 141 (or mud and the like) is flicked by the front wall 82h so that the pebble 141 is liable to hit the front arm 117 or is liable to scatter frontwardly from the front arm 117. Accordingly, the pebble 141 (or mud and the like) is unlikely to hit the brake line 54 arranged between the outer guard member 82 and the upper arm 43, the connecting portion between the knuckle 85 and the upper arm 43 or the like. Accordingly, it is possible to enhance an effect of protecting the brake line 54 and the front suspension 12.

Further, by arranging the upper edge of the front wall 82h at the position higher than the position of the upper leg portion 82e, a position of the bolt 137 for fixing the upper leg portion 82e to the knuckle 85 can be lowered while enhancing an effect of protecting the brake line 54 or the like by the front wall 82h by increasing a projection area of the front wall 82h from a front side of the vehicle body upwardly. Accordingly, the degree of freedom in arrangement of the brake line 54 can be increased.

As has been described heretofore by reference to FIG. 1, FIG. 2, FIG. 3 and FIG. 4, the suspension structure for the irregular ground traveling vehicle 10 includes: the upper arm 43 and the lower arm 44, each having one end portion respectively supported on the vehicle body frame 11; the wheel 25 supported on the other end portions of the upper arm 43 and the lower arm 44 by way of the knuckle member 87; the brake disc 102, which is disposed inside the wheel 25 in the radial direction and within the lateral width of the wheel 25; the caliper 95, which sandwiches the brake disc 102; the drive shaft 73, which is disposed between the upper arm 43 and the lower arm 44 and transmits a drive force to the wheel 25; and the boot 79, which covers the end portion of the drive shaft 73 on a wheel 25 side. The suspension structure further includes the outer guard member 82, which constitutes the guard member for covering the front side of the boot 79. The brake line 54, which extends from the caliper 95, is arranged within the width of the wheel 25 and below the upper arm 43. The outer guard member 82 extends to an area in the vicinity of the upper arm 43.

Due to such a constitution, the brake line 54 does not project toward the rim portion 28 side of the wheel 25 from the upper arm 43 and hence, the clearance between the rim portion 28 and the brake line 54 and the clearance between the rim portion 28 and the upper arm 43 can be ensured. Accordingly, the degree of freedom of the wheel 25 to be mounted can be increased. Further, the outer guard member 82 extends to the area in the vicinity of the upper arm 43 from the front side of the boot 79 and hence, the effect of scattered pebbles and the like exerted on the brake line 54 can be decreased.

Further, as shown in FIG. 3, the height H2 of the upper end of the outer guard member 82 is approximately equal to the height H2 of the upper end of the brake line 54 disposed below the upper arm 43 and hence, the brake line 54 can be protected by the outer guard member 82. The portion of the outer guard member 82 is disposed within the width of the wheel 25, and the connecting portion between the caliper 95 and the brake line 54 is covered by the outer guard member 82 as viewed in a front view. Accordingly, by arranging the outer guard member 82 within the width of the wheel 25, there is no gap between the wheel 25 and the outer guard member 82 as viewed in a front view and hence, the respective parts behind the outer guard member 82 can be surely protected. Further, the connecting portion between the caliper 95 and the brake line 54 is covered by the outer guard member 82 and hence, the connecting portion between the caliper 95 and the brake line 54 can be protected by the outer guard member 82.

Further, as shown in FIG. 2, FIG. 4 and FIG. 5, the cushion lower bracket 51 as a bracket which supports the lower end of the front cushion unit 23 is mounted on the upper surface of the upper arm 43, and the brake line 54 extends to the upper surface of the upper arm 43 through the rear side of the cushion lower bracket 51 and hence, the brake line 54 can be protected also by the upper arm 43 and the cushion lower bracket 51.

As shown in FIG. 7, the outer guard member 82 is formed into an approximately arcuate cross section such that the front surface 82q of the outer guard member 82 projects frontwardly, and the tangent line 140 which extends from the upper end of the front surface 82q of the outer guard member 82 is directed to the upper arm 43. Accordingly, it is possible to suppress pebbles or the like, which hits the front surface 82q of the outer guard member 82 from a front side of the vehicle body, from being scattered between the outer guard member 82 and the upper arm 43 and hence, a protective effect acquired by the outer guard member 82 can be enhanced.

The above-mentioned described embodiment merely describes one mode of the invention, and modifications and applications are conceivable without departing from the gist of the invention when appropriate.

The invention is also applicable to a saddle-ride-type vehicle while a rider rides on the vehicle in a straddling manner.

In this embodiment, the explanation is made mainly with respect to the constitution of the front suspension 12 on a left side which suspends the left front wheel 21. However, the constitution of the front suspension 12 on a right side, which suspends the right front wheel 21, is arranged in left and right symmetry with the constitution of the front suspension 12 on a left side, and have the same basic structure as the constitution of the front suspension 12 on a left side.

DESCRIPTION OF REFERENCE NUMBERS AND SIGNS

10: irregular ground traveling vehicle
11: vehicle body frame
23: front cushion unit
25: wheel
43: upper arm
44: lower arm
51: cushion lower bracket (bracket)
54: brake line
73: drive shaft
79: boot
82: outer guard member (guard member)
82q: front surface
85: knuckle
87: knuckle member
95: caliper
102: brake disc
140: tangent line

What is claimed is:

1. A suspension structure for an irregular ground traveling vehicle comprising:
an upper arm and a lower arm, each of which having one end portion supported on a vehicle body frame;
a wheel supported on the other end portions of the upper arm and the lower arm via a knuckle member;
a brake disc that is disposed inside the wheel in the radial direction and within a lateral width of the wheel;
a caliper that sandwiches the brake disc;
a drive shaft that is disposed between the upper arm and the lower arm and transmits a drive force to the wheel; and
a boot that covers an end portion of the drive shaft on a wheel side, wherein
the suspension structure includes a guard member that covers a front side of the boot,
a brake line, which extends from the caliper, is arranged within a width of the wheel and below the upper arm, and
the guard member extends to an area in a vicinity of the upper arm,
wherein a height of an upper end of the guard member is approximately equal to a height of an upper end of the brake line disposed below the upper arm.

2. The suspension structure for an irregular ground traveling vehicle according to claim 1, wherein a portion of the guard member is disposed within a width of the wheel, and a connecting portion between the caliper and the brake line are covered by the guard member as viewed in a front view.

3. The suspension structure for an irregular ground traveling vehicle according to claim 2, wherein a bracket, which supports a lower end of a front cushion unit, is mounted on an upper surface of the upper arm, and the brake line extends to an upper surface of the upper arm through a rear side of the bracket.

4. The suspension structure for an irregular ground traveling vehicle according to claim 2, wherein the guard member is formed into an approximately arcuate cross section such that a front surface of the guard member projects frontwardly, and a tangent line extending from an upper end of the front surface of the guard member is directed to the upper arm.

5. The suspension structure for an irregular ground traveling vehicle according to claim 1, wherein a bracket, which supports a lower end of a front cushion unit, is mounted on an upper surface of the upper arm, and the brake line extends to an upper surface of the upper arm through a rear side of the bracket.

6. The suspension structure for an irregular ground traveling vehicle according to claim 5, wherein the guard member is formed into an approximately arcuate cross section such that a front surface of the guard member projects frontwardly, and a tangent line extending from an upper end of the front surface of the guard member is directed to the upper arm.

7. The suspension structure for an irregular ground traveling vehicle according to claim 1, wherein the guard member is formed into an approximately arcuate cross section such that a front surface of the guard member projects frontwardly, and a tangent line extending from an upper end of the front surface of the guard member is directed to the upper arm.

8. The suspension structure for an irregular ground traveling vehicle according to claim 1, wherein the guard member is formed into an approximately arcuate cross section such that a front surface of the guard member projects frontwardly, and a tangent line extending from an upper end of the front surface of the guard member is directed to the upper arm.

* * * * *